(12) United States Patent
Saitoh et al.

(10) Patent No.: US 12,709,026 B2
(45) Date of Patent: Aug. 18, 2026

(54) SUCTION BOARD

(71) Applicant: SMC CORPORATION, Tokyo (JP)

(72) Inventors: Masaru Saitoh, Tsukubamirai (JP); Yoshikazu Kawano, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 820 days.

(21) Appl. No.: 18/187,015

(22) Filed: Mar. 21, 2023

(65) Prior Publication Data

US 2023/0302664 A1 Sep. 28, 2023

(30) Foreign Application Priority Data

Mar. 28, 2022 (JP) ................................ 2022-051263

(51) Int. Cl.
*B25J 15/06* (2006.01)

(52) U.S. Cl.
CPC ................................ *B25J 15/0691* (2013.01)

(58) Field of Classification Search
CPC ..... B25J 15/06; B25J 15/0616; B25J 15/0691
See application file for complete search history.

(56) References Cited

U.S. PATENT DOCUMENTS

2016/0067867 A1* 3/2016 Harter .................... B65G 47/91 294/188
2022/0274248 A1* 9/2022 Yoshikuwa .............. B25J 13/00
2024/0189965 A1* 6/2024 Ito ........................ B25J 15/0691
2024/0190022 A1* 6/2024 Ito ........................ B25J 15/0691

FOREIGN PATENT DOCUMENTS

JP 5756956 B2 7/2015
JP 2017005099 A * 1/2017

OTHER PUBLICATIONS

Machine Translation of JP-2017005099-A (Year: 2026).*

* cited by examiner

*Primary Examiner* — Gilbert Y Lee
(74) *Attorney, Agent, or Firm* — Oblon, McClelland, Maier & Neustadt, L.L.P.

(57) ABSTRACT

A suction board includes a nonwoven fabric sheet that has a uniform thickness and is formed into a disk shape, and a ring-shaped holding body that movably supports the nonwoven fabric sheet to an attaching adapter. The suction surface is formed by the flat surface of the nonwoven fabric sheet, and the nonwoven fabric sheet is provided with an air-impermeable region in the outer peripheral portion and an air-permeable region excluding the outer peripheral portion, and the density of the air-impermeable region is higher than the density of the air-permeable region.

10 Claims, 8 Drawing Sheets

SUCTION BOARD

CROSS-REFERENCE TO RELATED APPLICATIONS

This application is based upon and claims the benefit of priority from Japanese Patent Application No. 2022-051263 filed on Mar. 28, 2022, the contents of which are incorporated herein by reference.

BACKGROUND OF THE INVENTION

Field of the Invention

The present invention relates to a suction board used for a vacuum suction apparatus for attracting and holding a workpiece by suction force due to negative pressure.

Description of the Related Art

Conventionally, it is known that a vacuum suction apparatus for sucking and conveying a sheet-like or plate-like workpiece is equipped with a suction pad made of a porous material in order to suppress wrinkles and distortions of the workpiece.

For example, JP 5756956 B2 discloses a vacuum suction apparatus including a body having a port to which a negative pressure fluid is supplied, a pad being made of a porous material and having a flat suction surface, and a holding body for holding the pad in such a manner that the pad can be displaced relative to the body. The pad has a body portion and a thin lip portion formed on the periphery of the body portion, and the holding body is disposed between the lip portion and the body of the pad.

According to the vacuum suction apparatus, even when the workpiece is inclined with respect to the suction surface of the pad, the suction surface of the pad can be brought into contact with the workpiece.

SUMMARY OF THE INVENTION

In the case of the pad of the vacuum suction apparatus, in order to make the lip portion function as a sealing portion, the lip portion is pressed down when the pad is press-molded and as a result, a step is formed between the body portion and the lip portion. Such a pad is liable to deform in the vicinity of the step, and there is a possibility that the suction surface cannot maintain a flat shape.

Further, the pad of the vacuum suction device has a predetermined space between the holding plate attached to the body and the pad in order to allow the pad to be inclined. Therefore, when a high negative pressure is applied, there is a possibility that the pad deforms in a state of being inclined with respect to the holding plate, and the suction surface cannot maintain a flat shape.

The present invention has the object of solving the aforementioned problem.

A suction board having a suction surface configured to come into close contact with a workpiece includes an attaching adapter attached to a vacuum generating device, a nonwoven fabric sheet having a uniform thickness and being formed into a disk shape, and a ring-shaped holding body configured to movably support the nonwoven fabric sheet with respect to the attaching adapter. The suction surface is formed by the flat surface of the nonwoven fabric sheet, and the nonwoven fabric sheet is provided with an air-impermeable region on the outer peripheral portion and an air-permeable region excluding the outer peripheral portion, and the density of the air-impermeable region is higher than the density of the air-permeable region.

According to the suction board of the present invention, because the nonwoven fabric sheet has a uniform thickness, the nonwoven fabric sheet does not easily deform and the flat shape of the suction surface is maintained. Further, by adjusting the density of the nonwoven fabric sheet, it is possible to easily form an air-impermeable region in the outer peripheral portion and an air-permeable region excluding the outer peripheral portion.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a plan view of the nonwoven fabric sheet of the suction board of FIG. 1.

FIG. 4 is a plan view of a holding plate of the suction board of FIG. 1.

FIG. 7 is a sectional view of a suction board according to a second embodiment of the present invention.

DETAILED DESCRIPTION OF THE INVENTION

First Embodiment

Figure 1:
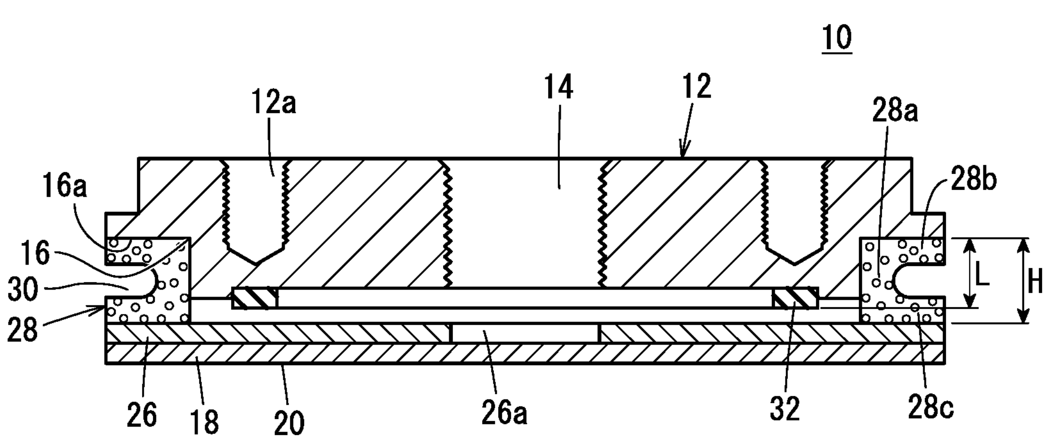
FIG. 1 is a sectional view of a suction board according to a first embodiment of the present invention.

A suction board 10 according to the first embodiment of the present invention will be described with reference to FIGS. 1 to 6. Moreover, in the following description, when terms in relation to up, down, left, and right directions are used, for the sake of convenience, such terms refer to the directions in the drawings, however, the actual arrangement of the constituent members or the like is not limited thereby.

Figure 2:
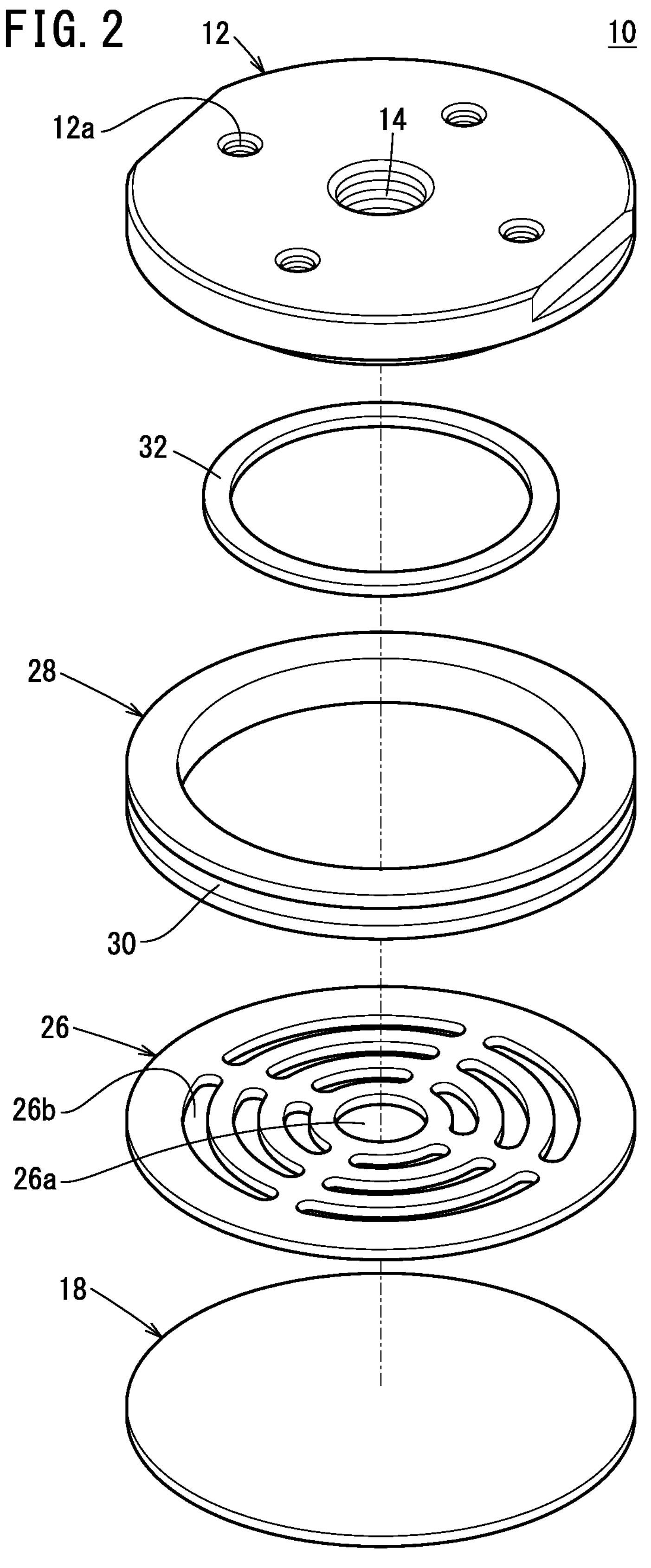
FIG. 2 is an exploded view in which the suction board of FIG. 1 is separated into components.

As shown in FIGS. 1 and 2, the suction board 10 includes an attaching adapter 12, a nonwoven fabric sheet 18, a holding plate 26, a holding body 28, and a damper 32. The attaching adapter 12 is made of a metal material such as an aluminum alloy and is formed in a disk shape. The attaching adapter 12 has a negative pressure supply passage 14 extending vertically through a central part of the attaching adapter 12 and is attached to a vacuum generating device (not shown). The lower portion of the attaching adapter 12 has a step portion 16 for mounting the holding body 28. Reference numeral **12*a* denotes a bolt hole for attaching the attaching adapter 12** to the vacuum generating device.

Figure 3:
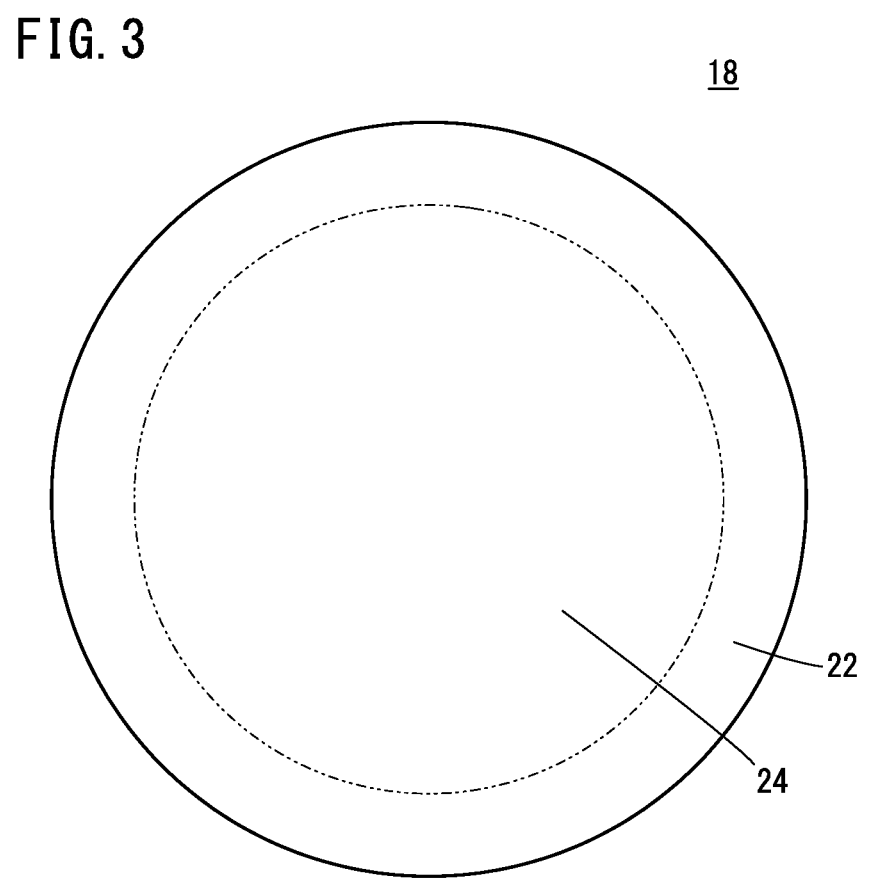

The nonwoven fabric sheet 18 contains resin fiber and electrically conductive filler. The nonwoven fabric sheet 18 is formed into a disk shape and has a uniform thickness. The flat lower surface of the nonwoven fabric sheet 18 constitutes a suction surface 20 that can be brought into close contact with a sheet-like or plate-like workpiece. As shown in FIG. 3, the nonwoven fabric sheet 18 includes an air-impermeable region 22 that occupies an outer peripheral portion and has air impermeability, and an air-permeable region 24 that occupies a portion excluding the outer peripheral portion and has air permeability. The density of the air-impermeable region 22 is higher than the density of the air-permeable region 24.

Figure 4:
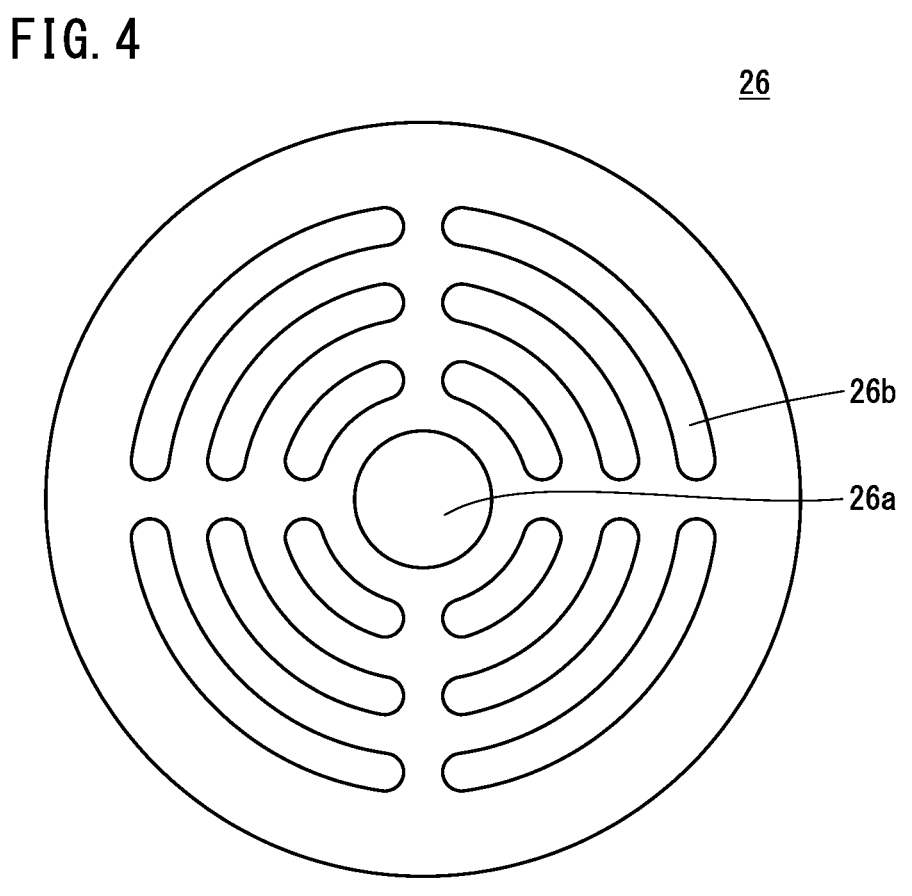

The holding plate 26 is made of a metal material such as stainless steel and is formed in a disk shape. The outer diameter of the holding plate 26 coincides with the outer diameter of the nonwoven fabric sheet 18. The holding plate 26 is joined to the nonwoven fabric sheet 18 with, for example, an electrically conductive double-sided tape. As shown in FIG. 4, a central part of the holding plate 26 has a first hole 26*a* that is aligned with the negative pressure supply passage 14 of the attaching adapter 12. The holding plate 26 has a plurality of arc-shaped second holes 26*b* surrounding the first hole 26*a*. The plurality of second holes 26*b* are formed at portions corresponding to the air-permeable region 24 of the nonwoven fabric sheet 18.

The nonwoven fabric sheet 18 has a uniform thickness and a shape without steps. Thus, the nonwoven fabric sheet 18 does not easily deform. Further, since the nonwoven fabric sheet 18 is supported by the holding plate 26 having high rigidity, the nonwoven fabric sheet 18 does not deform even when a large negative pressure (high vacuum pressure) acts on the nonwoven fabric sheet 18, and thus the flat shape of the suction surface 20 is reliably maintained. Further, since the holding plate 26 has a plurality of second holes 26*b* corresponding to the air-permeable region 24 of the nonwoven fabric sheet 18, the permeability of the nonwoven fabric sheet 18 is not obstructed by the holding plate 26.

The holding body 28 is a rubber sponge body formed by foaming a rubber material such as chloroprene rubber to which electrically conductive filler such as carbon or metal has been added, thereby making the rubber material porous. The holding body 28 has a large number of closed cells (closed bubbles) therein and does not have air permeability. The holding body 28 is formed into a ring shape and is disposed between the attaching adapter 12 and the holding plate 26. The holding body 28 is attached to the step portion 16 of the attaching adapter 12 and protrudes downward from the attaching adapter 12. The nonwoven fabric sheet 18 and the holding plate 26 are movably supported with respect to the attaching adapter 12 by the holding body 28.

The holding body 28 has a notch groove 30 that encircles the holding body 28 on the outer peripheral surface of the holding body 28. That is, the holding body 28 includes a first flange portion 28*b* extending radially outward from an upper portion of a main body portion 28*a*, and a second flange portion 28*c* extending radially outward from a lower portion of the main body portion 28*a*. The upper surface of the holding body 28 is joined to a stepped surface 16*a* of the step portion 16 of the attaching adapter 12, and the lower surface of the holding body 28 is joined to the upper surface of the outer peripheral portion of the holding plate 26.

The damper 32 is made of a rubber material such as NBR, and is molded in a ring shape. The damper 32 is mounted on the lower portion of the attaching adapter 12 and protrudes slightly downward from the lower surface of the attaching adapter 12. The damper 32 faces the upper surface of the holding plate 26 with a predetermined gap therebetween. When the holding plate 26 is displaced upward, the damper 32 comes into contact with the holding plate 26.

It is preferable to use the holding body 28 having a closed-cell structure at a squishing ratio of 30% or less. In other words, the holding body 28 is preferably used at a squishing ratio of 30% or less, which is within the range of elastic deformation. In repeated use, if the squishing ratio greatly exceeds 30%, the cells inside the holding body 28 burst, and the cushioning property and the air impermeability of the holding body 28 are impaired.

Therefore, it is preferable that the value of (H−L)/H is 0.3 or less, where H denotes the height (vertical thickness) of the main body portion 28*a* of the holding body 28 and L denotes the vertical distance from the stepped surface 16*a* of the attaching adapter 12 to a protruding end of the damper 32. Thus, the desired cushioning property and air impermeability of the holding body 28 can be maintained for a long period of time. The cushioning property of the holding body 28 depends on the main body portion 28*a*, and the first flange portion 28*b* and the second flange portion 28*c* do not contribute to the cushioning property of the holding body 28.

The upper surface of the holding body 28 is joined to the stepped surface 16*a* of the attaching adapter 12 by using an electrically conductive double-sided tape (not shown). The lower surface of the holding body 28 is joined to the upper surface of the outer peripheral portion of the holding plate 26 joined to the nonwoven fabric sheet 18 by using an electrically conductive double-sided tape (not shown). Specifically, a double-sided tape is placed between the upper surface of the holding body 28 and the stepped surface 16*a* of the attaching adapter 12, and a hard jig (not shown) is inserted into the notch groove 30 of the holding body 28 while the double-sided tape is placed between the lower surface of the holding body 28 and the upper surface of the holding plate 26.

Thereafter, the first flange portion 28*b* of the holding body 28 is sandwiched between the attaching adapter 12 and the jig, whereby the holding body 28, the double-sided tape, and the attaching adapter 12 are press-joined to each other. Thereafter, the second flange portion 28*c* of the holding body 28 is sandwiched between the holding plate 26 and the jig, whereby the holding body 28, the double-sided tape, and the holding plate 26 are pressed-joined to each other. The order of these two press-joining steps may be reversed.

In the press-joining step, the first flange portion 28*b* of the holding body 28 is pressed to a large extent and adheres to the double-sided tape. Similarly, the second flange portion 28*c* of the holding body 28 is pressed to a large extent and adheres to the double-sided tape. Thus, the holding body 28 and the attaching adapter 12 are reliably joined by the double-sided tape, and the holding body 28 and the holding plate 26 are reliably joined by the double-sided tape.

Next, with reference to FIGS. 5 and 6, an operation in which a plate-like workpiece W such as a glass substrate is sucked and held by the suction board 10 will be described. It is assumed here that the workpiece W has a size larger than the suction surface 20 of the suction board 10 and is sucked and held by a plurality of suction boards 10. Hereinafter, a vacuum generating device (not shown) to which a plurality of suction boards 10 are attached is referred to as a "vacuum suction device".

The vacuum suction device is operated to supply negative pressure (vacuum pressure) to the negative pressure supply passage 14 of the suction board 10, and the vacuum suction device is moved so that the suction board 10 approaches the workpiece W. When the negative pressure is supplied to the negative pressure supply passage 14, the negative pressure acts on the upper surface of the nonwoven fabric sheet 18 through the first hole 26*a* and the second holes 26*b* of the holding plate 26. Through the air-permeable region 24 of the nonwoven fabric sheet 18, this negative pressure further acts on the workpiece W that faces the lower surface of the nonwoven fabric sheet 18.

When the weight of the workpiece W is relatively small, the workpiece W is displaced upward (lifted) and adheres to the suction surface 20 of the suction board 10 even if the workpiece W is not pressed onto the suction board 10. When the weight of the workpiece W is relatively large, the suction board 10 is pressed onto the workpiece W, whereby the suction surface 20 of the suction board 10 is brought into close contact with the workpiece W.

Once the workpiece W is brought into close contact with the suction surface 20 of the suction board 10, the differential pressure between the negative pressure acting on the upper surface of the workpiece W and the atmospheric pressure acting on the lower surface of the workpiece W rapidly increases. Due to this differential pressure, the workpiece W pushes up the nonwoven fabric sheet 18 and the holding plate 26, and displaces upward while squishing the holding body 28. When the holding plate 26 comes into contact with the damper 32, the displacement of the workpiece W stops. In this way, the workpiece W is sucked and held by the suction board 10 in a stable state. The impact at the time of lifting the workpiece W is absorbed by the holding body 28 being squished and by the holding plate 26 being in contact with the damper 32.

Since the nonwoven fabric sheet 18 has an air-impermeable region 22 in the outer peripheral portion thereof, and the holding body 28 having a closed-cell structure has air impermeability, vacuum leak does not occur. Joint portions between the holding body 28 and the attaching adapter 12, between the holding body 28 and the holding plate 26, and between the holding plate 26 and the nonwoven fabric sheet 18 are sealed so that vacuum leak does not occur.

Figure 5:
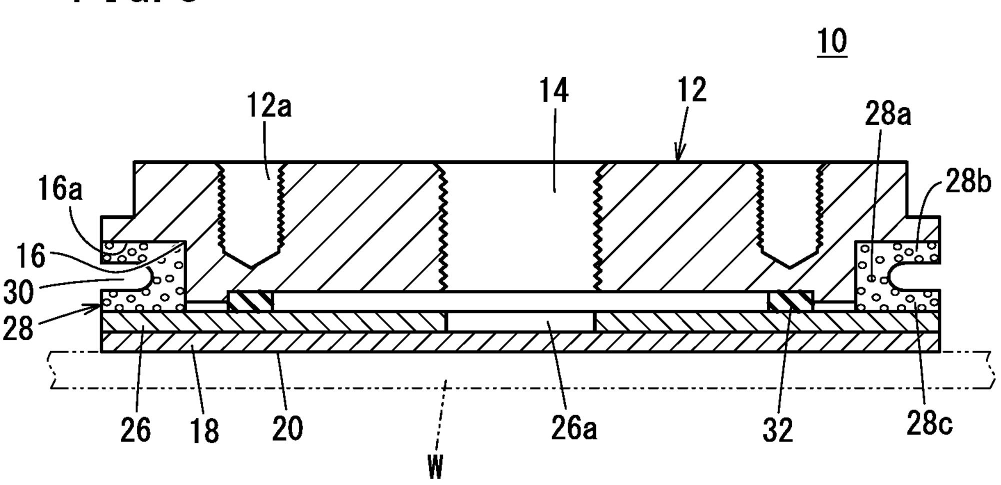
FIG. 5 is a view showing a state in which the holding plate of the suction board of FIG. 1 is displaced without changing the posture and the workpiece is sucked and held.

FIG. 5 shows a state in which the nonwoven fabric sheet 18 and the holding plate 26 are displaced upward without changing the posture and also the workpiece W is sucked and held. When the upper surface of the workpiece W having high rigidity has a plane with relatively high accuracy and the plurality of suction boards 10 are attached to the vacuum generating device with high accuracy, the workpiece W is sucked and held in the state shown in FIG. 5 by all the suction boards 10.

Figure 6:
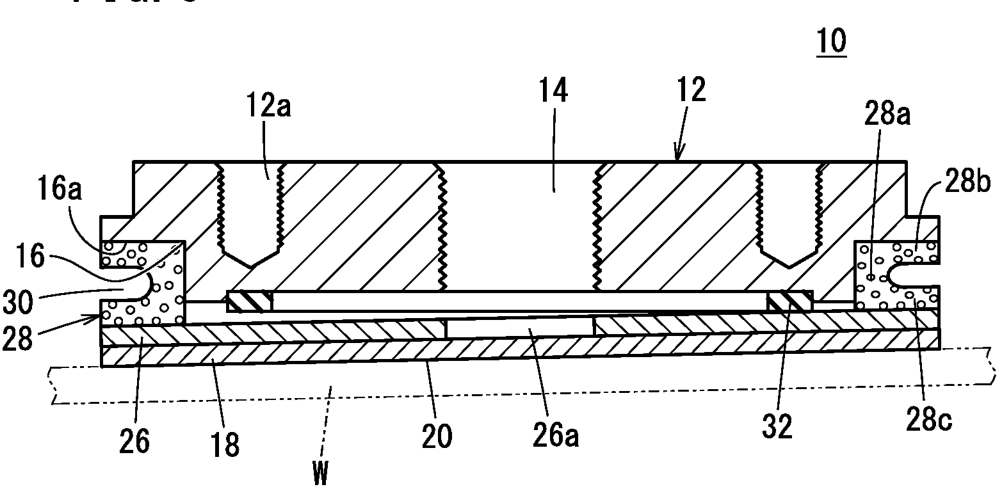
FIG. 6 is a view showing a state in which a holding plate of the suction board of FIG. 1 is inclined and a workpiece is sucked and held.

On the other hand, when part of the plurality of suction boards 10 is not attached to the vacuum generating device in an accurate posture (when an attachment error is not less than a predetermined value), the workpiece W is sucked and held in the state shown in FIG. 6 by the part of the suction boards 10. Similarly, even when the upper surface of the workpiece W having high rigidity is not a flat surface, the workpiece W is sucked and held in the state shown in FIG. 6 at some of the suction boards 10. Thus, the workpiece W can be brought into close contact with the suction surfaces 20 of all the suction boards 10.

As shown in FIG. 6, the nonwoven fabric sheet 18 and the holding plate 26 are inclined with respect to the attaching adapter 12, and the workpiece W adheres to the inclined nonwoven fabric sheet 18. The amount of squishing the holding body 28 is the largest at the right end that is one end in the diameter direction, and the amount of squishing the holding body 28 is the smallest at the left end that is the other end in the diameter direction. At the beginning of the description of the suction holding action, it was described that the suction board 10 approaches the workpiece W while the negative pressure is supplied to the negative pressure supply passage 14 of the suction board 10. However, after the suction board 10 is pressed onto the workpiece W, the negative pressure may be supplied to the negative pressure supply passage 14.

According to the suction board 10 of the present embodiment, since the nonwoven fabric sheet 18 has a uniform thickness, the nonwoven fabric sheet 18 does not easily deform and the flat shape of the suction surface 20 is maintained. Moreover, since the nonwoven fabric sheet 18 is supported by the holding plate 26 having high rigidity, the nonwoven fabric sheet 18 does not deform even when a large negative pressure (high vacuum pressure) acts on the nonwoven fabric sheet 18.

In addition, by adjusting the density of the nonwoven fabric sheet 18, it is possible to easily form the air-impermeable region 22 in the outer peripheral portion and the air-permeable region 24 excluding the outer peripheral portion. Vacuum leak does not occur because the nonwoven fabric sheet 18 is provided with an air-impermeable region 22 and also the holding body 28 is air-impermeable.

Further, since the nonwoven fabric sheet 18 and the holding plate 26 are movably supported with respect to the attaching adapter 12 by the holding body 28 having a closed-cell structure, an impact at the time of lifting the workpiece W is absorbed. Moreover, even if there is an error larger than a predetermined value in the attachment of the suction board 10 to the vacuum generating device, the workpiece W certainly adheres to the suction surface 20 of the suction board 10.

Further, since the holding body 28 has the notch groove 30 for inserting the jig, it is possible to reliably join the holding body 28 by means of the double-sided tape while the ratio of squishing the main body portion 28*a* in use is set to a preferable value. Further, since the nonwoven fabric sheet 18, the holding body 28, and the double-sided tape is electrically conductive, it is possible to release to the outside static electricity caused by sucking and holding of the workpiece W.

Second Embodiment

Figure 7:
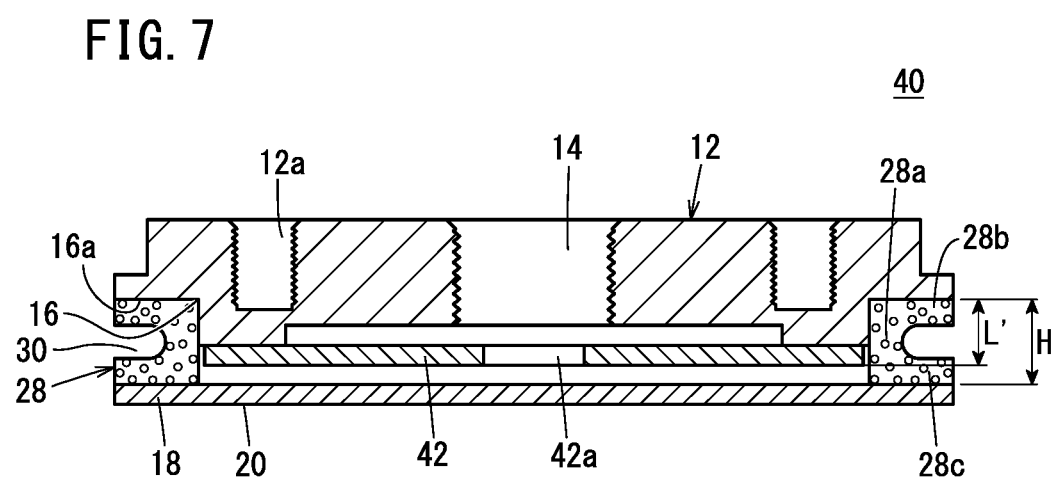
Figure 8:
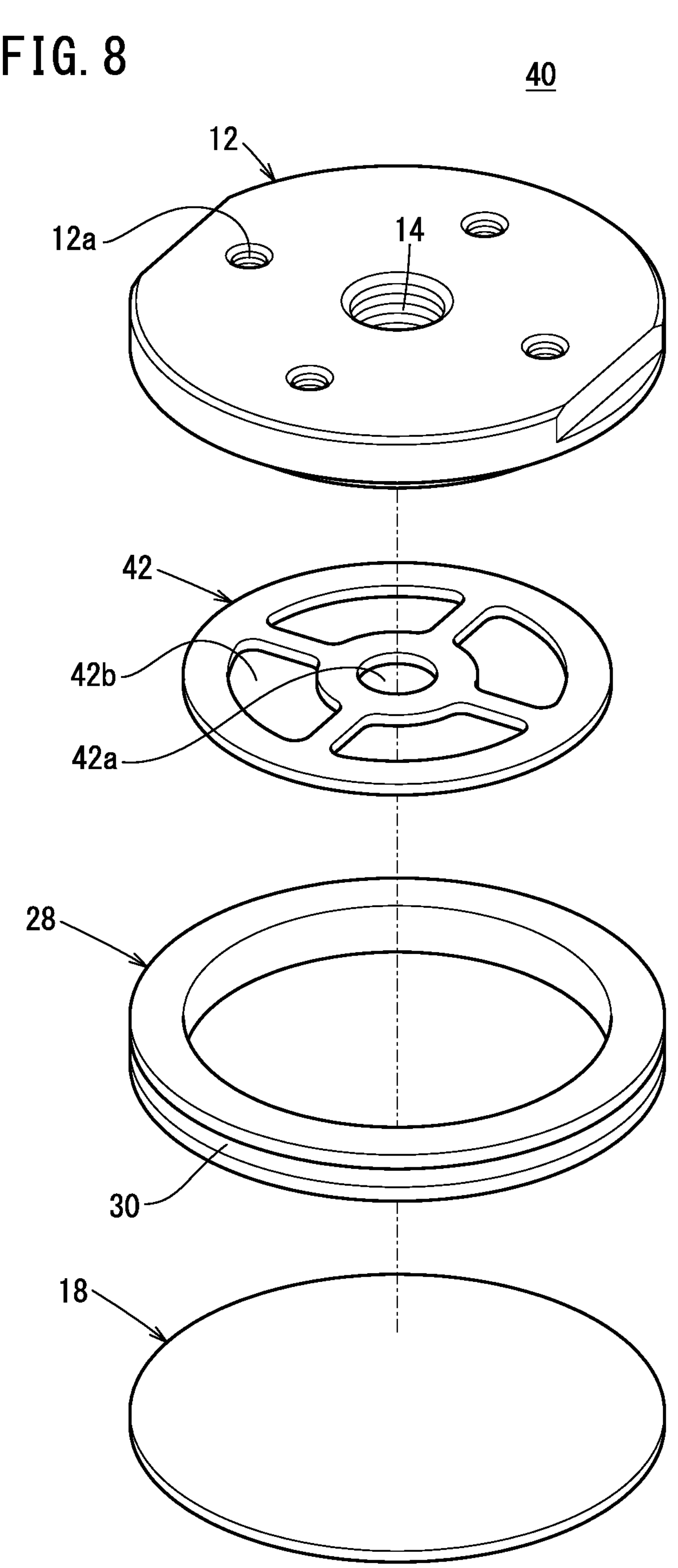
FIG. 8 is an exploded view in which the suction board of FIG. 7 is separated into components.

Next, a suction board 40 according to a second embodiment of the present invention will be described with reference to FIGS. 7 and 8. In the suction board 40 according to the second embodiment, the same or equivalent components as those of the above-described suction board 10 are denoted by the same reference numerals, and detailed description thereof is omitted. As shown in FIGS. 7 and 8, the suction board 40 includes the attaching adapter 12, the nonwoven fabric sheet 18, a holding plate 42, and the holding body 28.

The holding plate 42 is made of a metal material such as stainless steel and is formed in a disk shape. The holding plate 42 is joined to the attaching adapter 12 using, for example, a double-sided tape having electric conductivity. A central portion of the holding plate 42 is provided with a first hole 42*a* that is aligned with the negative pressure supply passage 14 of the attaching adapter 12. The holding plate 42 has a plurality of arc-shaped second holes 42*b* surrounding the first hole 42*a*. The plurality of second holes 42*b* are formed at positions corresponding to the air-permeable regions 24 of the nonwoven fabric sheet 18. The holding plate 42 faces the nonwoven fabric sheet 18 with a predetermined gap therebetween. When the nonwoven fabric sheet 18 is displaced upward, the nonwoven fabric sheet 18 comes into contact with the holding plate 42.

The holding body 28 that is a rubber sponge body has a large number of closed cells therein and does not have air permeability. The holding body 28 is formed into a ring shape and is disposed between the attaching adapter 12 and the nonwoven fabric sheet 18. The outer diameter of the holding body 28 coincides with the outer diameter of the nonwoven fabric sheet 18. The holding plate 42 is disposed on an inner side of the holding body 28. The holding body 28 is mounted on the step portion 16 of the attaching adapter 12 and projects downwardly beyond the holding plate 42. The nonwoven fabric sheet 18 is movably supported by the holding body 28 with respect to the attaching adapter 12.

The holding body 28 has a notch groove 30 that encircles the holding body 28 on the outer peripheral surface of the holding body 28. The first flange portion **28*b* of the holding body 28 is joined to the stepped surface 16*a* of the attaching adapter 12. The second flange portion 28*c* of the holding body 28 is joined to the upper surface of the air-impermeable region 22 of the nonwoven fabric sheet 18**.

It is preferable to use the holding body 28 having a closed-cell structure at a squishing ratio of 30% or less. Therefore, assuming that the height of the main body portion **28*a* of the holding body 28 is H and the distance in the vertical direction from the stepped surface 16*a* of the attaching adapter 12 to the lower surface of the holding plate 42 is L', it is preferable that a value of (H−L')/H is 0.3 or less. Thus, the desired cushioning property and air impermeability of the holding body 28** can be maintained for a long period of time.

The upper surface of the holding body 28 is joined to the stepped surface **16*a* of the attaching adapter 12 by using a double-sided tape having electric conductivity. The lower surface of the holding body 28 is joined to the upper surface of the nonwoven fabric sheet 18 by using an electrically conductive double-sided tape. Specifically, a double-sided tape is placed between the upper surface of the holding body 28 and the stepped surface 16*a* of the attaching adapter 12, and a hard jig is inserted into the notch groove 30 of the holding body 28 while the double-sided tape is placed between the lower surface of the holding body 28 and the upper surface of the nonwoven fabric sheet 18**.

Thereafter, the first flange portion **28*b* of the holding body 28 is sandwiched between the attaching adapter 12 and the jig, whereby the holding body 28, the double-sided tape, and the attaching adapter 12 are press-joined to each other. Thereafter, the second flange portion 28*c* of the holding body 28 is sandwiched between the nonwoven fabric sheet 18 and the jig, whereby the holding body 28, the double-sided tape, and the nonwoven fabric sheet 18** are press-joined to each other. The order of these two press-joining steps may be reversed.

In the press-joining step, the first flange portion **28*b* of the holding body 28 is pressed to a large extent and adheres to the double-sided tape. Similarly, the second flange portion 28*c* of the holding body 28 is pressed to a large extent and adheres to the double-sided tape. Thus, the holding body 28 and the attaching adapter 12 are reliably joined by the double-sided tape, and the holding body 28 and the nonwoven fabric sheet 18** are reliably joined by the double-sided tape.

When a negative pressure is supplied to the negative pressure supply passage 14, the negative pressure acts on the upper surface of the nonwoven fabric sheet 18 through the first hole **42*a* and the second holes 42*b* of the holding plate 42. Through the air-permeable region 24 of the nonwoven fabric sheet 18, this negative pressure further acts on the workpiece W that faces the lower surface of the nonwoven fabric sheet 18**.

When the workpiece W is once brought into close contact with the suction surface 20 of the suction board 40, the differential pressure between the negative pressure acting on the upper surface of the workpiece W and the atmospheric pressure acting on the lower surface of the workpiece W rapidly increases. Due to this differential pressure, the workpiece W is displaced upward while pushing up the nonwoven fabric sheet 18 and squishing the holding body 28. When the nonwoven fabric sheet 18 comes into contact with the holding plate 42, the displacement of the workpiece W stops. Since the nonwoven fabric sheet 18 in contact with the holding plate 42 is supported by the holding plate 42 having high rigidity, the nonwoven fabric sheet 18 does not deform even when a large negative pressure is applied thereto. An impact at the time of lifting the workpiece W is absorbed by the holding body 28 being squished.

The suction board according to the present invention is not limited to the above-described embodiment, and various configurations can be adopted without departing from the gist of the present invention.

The invention claimed is:

1. A suction board including a suction surface configured to come into close contact with a workpiece, the suction board comprising:

an attaching adapter attached to a vacuum generating device;

a nonwoven fabric sheet having a uniform thickness and being formed into a disk shape; and a ring-shaped holding body configured to movably support the nonwoven fabric sheet with respect to the attaching adapter, wherein the suction surface is formed by a flat surface of the nonwoven fabric sheet, the nonwoven fabric sheet is provided with an air-impermeable region on an outer peripheral portion and an air-permeable region excluding the outer peripheral portion, and a density of the air-impermeable region is higher than a density of the air-permeable region.

2. The suction board according to claim 1, wherein the holding body has a closed-cell structure.

3. The suction board according to claim 2, wherein a holding plate is joined to the attaching adapter.

4. The suction board according to claim 3, wherein the holding body includes a notch groove for inserting a jig, the notch groove encircles the holding body on an outer peripheral surface of the holding body, the holding body is joined to the attaching adapter using a double-sided tape, and the holding body is joined to the nonwoven fabric sheet using a double-sided tape.

5. The suction board according to claim 4, wherein a value of (H−L')/H is 0.3 or less where H is a height of a main body portion of the holding body, and L' is a distance from a stepped surface of the attaching adapter to which the holding body is joined to the holding plate.

6. The suction board according to claim 2, wherein the nonwoven fabric sheet and the holding body are electrically conductive.

7. The suction board according to claim 2, wherein a holding plate is joined to the nonwoven fabric sheet.

8. The suction board according to claim 7, wherein the holding body includes a notch groove for inserting a jig therein, the notch groove encircles the holding body on an outer peripheral surface of the holding body, the holding body is joined to the attaching adapter using a double-sided tape, and the holding body is joined to the holding plate using a double-sided tape.

9. The suction board according to claim 8, further comprising a damper attached to the attaching adapter, wherein the damper is configured to come into contact with the holding plate.

10. The suction board according to claim 9, wherein a value of (H−L)/H is 0.3 or less where H is a height of a main body portion of the holding body, and L is a distance from a stepped surface of the attaching adapter to which the holding body is joined to a protruding end of the damper.

* * * * *